(12) United States Patent  
Hubbard

(10) Patent No.: US 7,906,005 B2
(45) Date of Patent: Mar. 15, 2011

(54) MEANS AND METHOD OF CHEMICAL PRODUCTION

(76) Inventor: Frank G. Hubbard, Summit, NJ (US)

(*) Notice: Subject to any disclaimer, the term of this patent is extended or adjusted under 35 U.S.C. 154(b) by 1420 days.

(21) Appl. No.: 10/913,954

(22) Filed: Aug. 6, 2004

(65) Prior Publication Data

US 2005/0072687 A1 Apr. 7, 2005

Related U.S. Application Data

(60) Provisional application No. 60/493,435, filed on Aug. 8, 2003.

(51) Int. Cl.
*C25B 1/16* (2006.01)
(52) U.S. Cl. .............. 205/516; 205/536
(58) Field of Classification Search .......... 430/5, 311; 205/516, 536, 510, 508
See application file for complete search history.

(56) References Cited

U.S. PATENT DOCUMENTS

| 2,553,557 | A | * | 5/1951 | Dunning | 62/607 |
|---|---|---|---|---|---|
| 2,701,790 | A | | 2/1955 | Goument | |
| 3,210,262 | A | | 10/1965 | Klein | |
| 3,241,912 | A | | 3/1966 | Nicolaisen | |
| 3,390,065 | A | * | 6/1968 | Cooper | 205/412 |
| 3,775,272 | A | | 11/1973 | Danna | |
| 4,253,923 | A | * | 3/1981 | Lynch et al. | 205/512 |
| 4,308,123 | A | | 12/1981 | Lynn | |
| 4,329,215 | A | | 5/1982 | Scoville | |
| 4,339,313 | A | * | 7/1982 | Rechlicz | 205/512 |
| 4,390,512 | A | | 6/1983 | Loehr et al. | |
| 4,391,680 | A | | 7/1983 | Mani et al. | |
| 4,586,992 | A | * | 5/1986 | Miyake et al. | 205/512 |
| 5,061,343 | A | | 10/1991 | Azarniouch et al. | |
| 5,458,858 | A | * | 10/1995 | Dawkins | 422/234 |
| 5,518,583 | A | | 5/1996 | Nykänen et al. | |
| 5,616,234 | A | * | 4/1997 | Rhees et al. | 205/500 |
| 5,688,385 | A | | 11/1997 | Rhees et al. | |
| 5,935,393 | A | | 8/1999 | Shinomiya et al. | |
| 6,004,449 | A | * | 12/1999 | Vetrovec | 205/466 |
| 6,340,736 | B1 | | 1/2002 | Coenen et al. | |
| 6,592,727 | B2 | | 7/2003 | Yamamoto | |

* cited by examiner

*Primary Examiner* — Mark F Huff
*Assistant Examiner* — Rashid Alam
(74) *Attorney, Agent, or Firm* — Ward & Olivo

(57) ABSTRACT

Disclosed is a process for manufacturing bleach (or sodium hypochlorite) and caustic potash (or KOH) without the need for shipping or storing chlorine gas. Specifically, the present invention relates to the manufacture of potassium hydroxide and chlorine gas, through several process options, for the manufacture of sodium hypochlorite (or bleach), hydrochloric acid (HCl) and/or other chlorinated compounds. The disclosed process allows operating flexibility based on chlorine demand, reduces capital costs and eliminates the need for the transportation and storage of chlorine gas.

11 Claims, 4 Drawing Sheets

MEANS AND METHOD OF CHEMICAL PRODUCTION

CROSS-REFERENCE TO RELATED APPLICATIONS

This application claims priority to provisional application Ser. No. 60/493,435 filed on Aug. 8, 2003.

FIELD OF THE INVENTION

The present invention relates to a means for producing bleach (sodium hypochlorite) and potassium hydroxide (KOH) using chlorine gas produced on-site from electrolysis of potassium chloride. More specifically, the invention relates to a process that will allow the manufactured chlorine gas to be sold directly to an adjacent plant, or to be used onsite for the manufacture of hydrochloric acid and/or bleach. The flexibility of this process provides unique operating alternatives based on current market demand and never requires the transportation of or the onsite storage of the extremely hazardous chlorine gas.

BACKGROUND OF THE INVENTION

Currently, all potassium hydroxide plants in the United States sell liquid chlorine and potassium hydroxide. Chlorine and potassium hydroxide are transported by rail to customers. At present, five plants produce chlorine and potassium hydroxide. Potassium chloride and water are electrolyzed to produce chlorine, potassium hydroxide and hydrogen according to the following reaction:

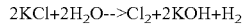
$$2KCl + 2H_2O \rightarrow Cl_2 + 2KOH + H_2$$

Between 2,400 and 3,200 kiloWatt hours per ton of chlorine produced are needed for this reaction depending on the electrolysis technology.

Chlorine, potassium hydroxide and hydrogen are produced from an aqueous potassium chloride solution by mercury, asbestos diaphragm or membrane cell electrolysis. With some variations, the usual process involves brine purification and de-ionization, electrolysis, chlorine processing, potassium hydroxide processing, and hydrogen processing.

Processes for potassium hydroxide (KOH) production are well known in prior art. One such process is depicted in FIG. 1. Solid potassium chloride (KCl) salt 1 arrives at a processing plant via rail car 4. Potassium chloride 1 is transferred to a salt dissolver 2, wherein the solid, impure potassium chloride 1 is dissolved in water to form brine 3. At some plants, sodium chloride (NaCl) is substituted for potassium chloride to ultimately produce sodium hydroxide (NaOH) instead of potassium hydroxide (KOH). Next, appropriate chemicals are added to the brine 3 to precipitate impurities. The resulting mixture is fed to a thickener 5, from which precipitates and clarified raw brine 3 are separately withdrawn. The clarified brine 3 is then filtered by brine filter 6. Solid precipitates are sent to a landfill, or disposed of by any suitable method. The filtered brine 3 is then pumped to a filtered brine tank 7. Next, secondary brine purification is performed on brine 3 via an ion exchange unit 8. Secondary brine purification ensures high efficiency and long lasting membrane electrolyzer operation. Deionized brine 3 is stored in tank 9 before being sent to electrolyzer 10.

In electrolyzer 10, electric power is provided via an AC-DC rectifier 11. Deionized brine 3 and purified water 12 are pumped into electrolyzer 10. Application of electricity causes anions, i.e. chloride ions, to collect at the anode side of the electrolyzer 10 and cations, i.e. potassium and hydrogen ions, to collect at the cathode side of the electrolyzer 10. The chlorine produced from the weak solution of brine 3, is either drawn from the anode side of the cell in a vacuum or the solution is pumped to a dechlorination process.

To process the wet chlorine, the gas is cooled and the brine 3 condensate is removed in a dechlorinator 14. The weak solution of brine 3 is then returned to the brine treatment area, specifically the salt dissolver 2. Next, the chlorine gas is dried with a sulfuric acid dryer 15. The dry gas is then compressed and chilled for storage in rail cars 17. The chlorine gas may also be stored in cylinders or bulk plant storage.

However, drying, compressing storing the chlorine gas are major drawbacks to plant operation. Drying and compressing the chlorine is expensive and increases the capital costs for plant operation by as much as 10-20%. Additionally, storage of chlorine gas on-site is undesirable because it is potentially very hazardous and may be a terrorist target.

Potassium hydroxide and hydrogen, collected at the cathode side of electrolyzer 10, are drawn from the membrane cell electrolyzer 10. Potassium hydroxides leave the electrolyzer 10 at approximately 30-35% by weight in an aqueous solution at a temperature between approximately 190 and 200° F. This low strength potassium hydroxide solution is split. One stream is cooled and stored for use in the brine treatment tank 5. The other, major, stream is sent to the evaporator 18 for removing the water. In the evaporator 18, the hot potassium hydroxide solution is concentrated to the commercial grade specification, i.e., approximately 45%. Next, the product is cooled to about 170° F. and sent to product storage 20.

Hydrogen gas, also produced on the cathode side of the electrolyzer 10, may be sent to vent 21 for pressure control. The majority of the produced hydrogen, however, is cooled to remove water vapor before it is pumped to hydrogen compressor. After the hydrogen is compressed, it is sent to the boiler 22 where it is burned as fuel.

Currently, there are many chemical plants in the United States that produce sodium hypochlorite by the chemically reactive combination of chlorine and sodium hydroxide. However, current facilities require the delivery of hazardous chlorine gas by truck or rail to the production site. Integration of potassium hydroxide production with bleach manufacture is a logical combination that can both reduce transportation costs and eliminate the need to store hazardous chlorine gas on-site. Presently, however, there are no known plants in the United States that produce potassium hydroxide and sodium hypochlorite by the processes according to the present invention.

It is anticipated that there will be a new demand for these dedicated chlorine plants, since the Department of Homeland Security wants the public transportation of hazardous chlorine and chlorine storage eliminated as possible terrorist targets.

SUMMARY OF THE INVENTION

This invention described herein relates to the process for the integrated manufacture of potassium hydroxide and bleach. Specifically the process allows several process options which can provide economic flexibility based on the varying demands of chlorine products. The chlorine gas that is produced via electrolysis of KCl may be sold directly to a customer via pipeline. Alternatively, the plant operator can divert the chlorine production from chlorine pipeline deliveries to either NaOCl (bleach) or HCl (hydrochloric acid) production.

The chemical reactions of the new process combination can be summarized as follows:

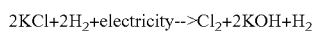
$$2KCl + 2H_2O + electricity \rightarrow Cl_2 + 2KOH + H_2$$

(Electrolysis of potassium chloride salt with demineralized and deionized water yields chlorine, potassium hydroxide and hydrogen.)

$$Cl_2 + 2NaOH \rightarrow NaOCl + H_2O + NaCl$$

(Chlorine reacts with purchased sodium hydroxide to yield sodium hypochlorite, water and sodium chloride.)

$$H_2 + Cl_2 \rightarrow 2HCl$$

(The reaction of hydrogen and chlorine produces hydrochloric acid.)

The present invention is the first process of its kind to integrate the processes of KOH and bleach manufacture. This new process design provides for easy economical balance and allows the plant operator to shift production based on the varying demands of the chlorine products. Further, the disclosed process eliminates the need for onsite storage of potentially hazardous chlorine gas.

It is therefore an object of the invention to eliminate the need for the transportation and onsite storage of highly dangerous chlorine gas.

It is another object of the invention to provide greater production flexibility than existing caustic potash plants.

It is still another object of the invention to offer greater profitability than existing caustic potash plants or electrolysis bleach plants.

It is still a further object of the invention to provide a process in which production of chlorine gas can be easily diverted from direct sale to production of bleach and/or hydrochloric acid.

It is yet a further object of the invention to provide a process with better economics than existing caustic potash plants and electrolysis bleach plants.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of the preferred embodiment (as well as some alternative embodiments) of the present invention.

This invention is applicable for a standalone plant or a plant dedicated for gaseous chlorine delivery to an adjacent plant for production of hydrochloric acid, bleach, or various chemicals which require chlorine gas as a reactant.

The present invention involves the integrated process for the manufacture of potassium hydroxide, KOH, also called caustic potash, and sodium hypochlorite. Chlorine gas that is produced by the electrolysis of a potassium chloride solution in an electrolysis cell is used directly in sodium hypochlorite (bleach) manufacture by chemically combining the chlorine with purchased sodium hydroxide. Alternatively, hydrochloric acid, HCl, may be produced by the burning of chlorine in the presence of co-product hydrogen. Direct use of chlorine from KOH manufacture eliminates the need for transporting or storing the hazardous chlorine gas. Further, co-product hydrogen may be collected independently, dried and sold to customers.

Figure 1:
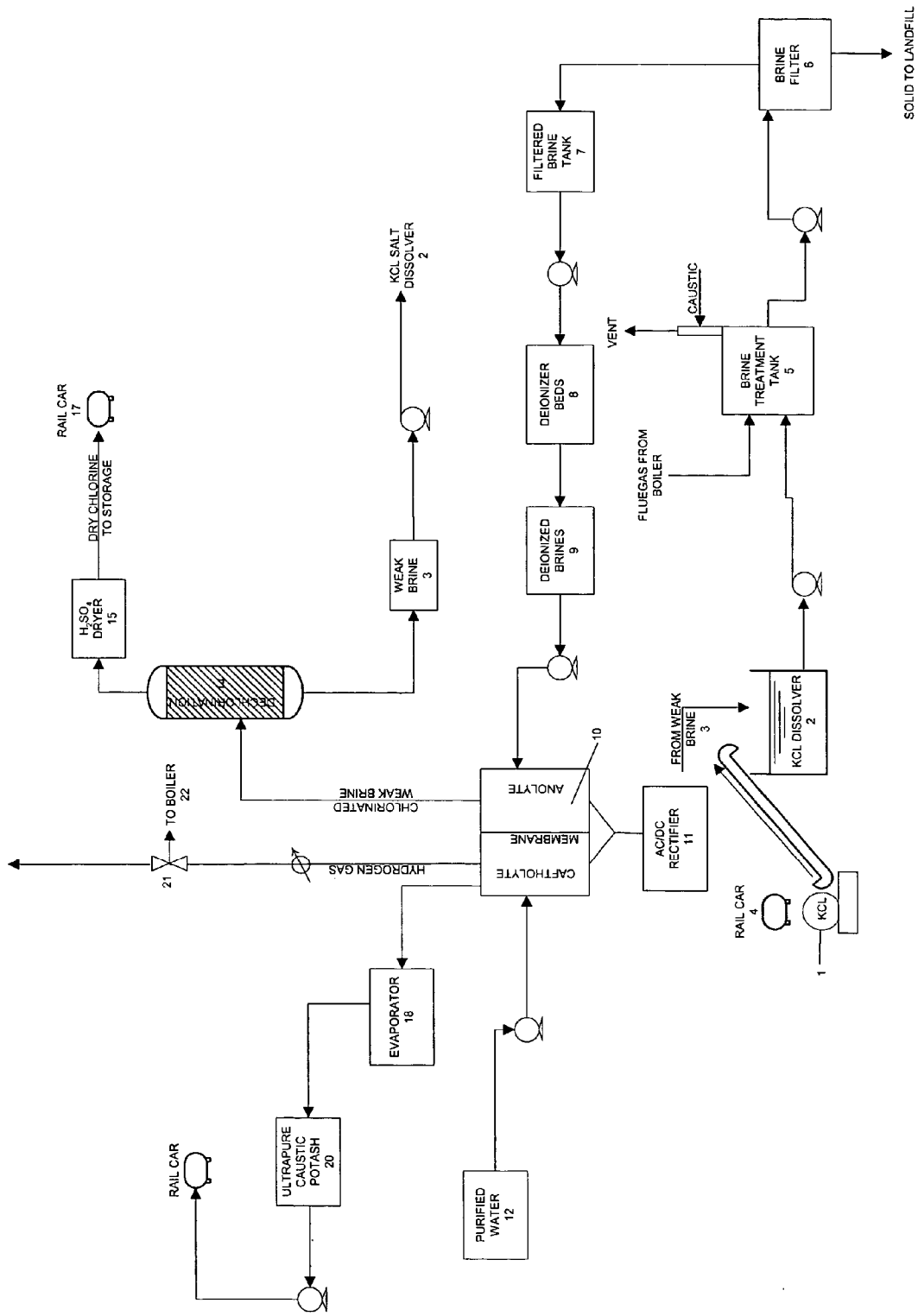
FIG. 1 shows a schematic of the process of producing potassium hydroxide and chlorine gas.
Figure 2:
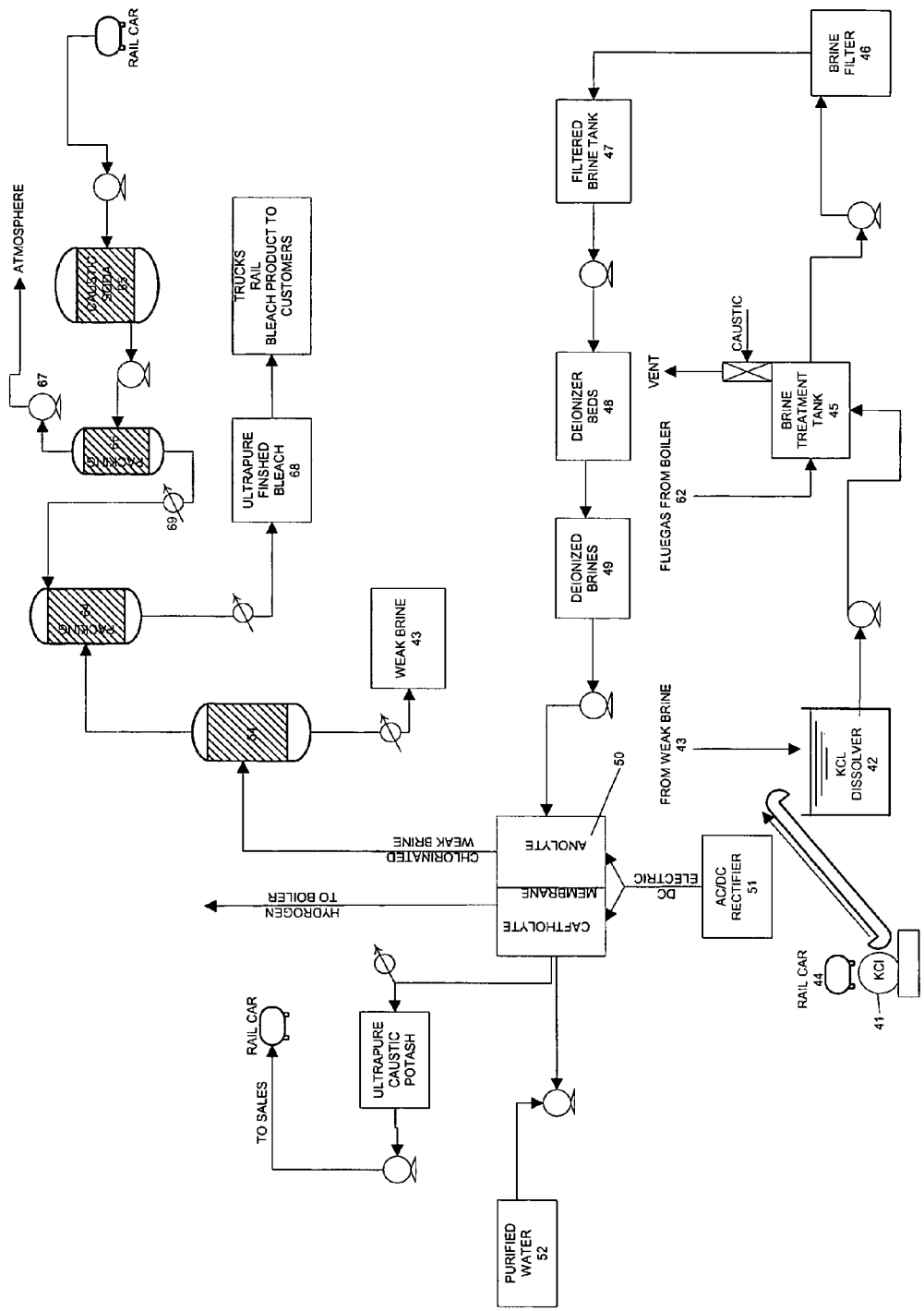
FIG. 2 depicts a schematic of the manufacturing process in accordance with the preferred embodiment of the present invention.

According to the preferred embodiment of the present invention, shown in FIG. 2, solid potassium chloride (KCl) salt 41 arrives at a processing plant via rail car 44. Potassium chloride 41 is transferred to a salt dissolver 42, wherein the solid, impure potassium chloride 41 is dissolved in water to form brine 43. In an alternative embodiment, sodium chloride (NaCl) may be substituted for potassium chloride to ultimately produce sodium hydroxide (NaOH) instead of potassium hydroxide (KOH).

Next, appropriate chemicals are added to the brine 43 to precipitate impurities that may be potentially damaging to the membrane in the electrolyzer. Among the most common adulterants found in impure brine are sulfate ions, which may be removed by precipitation with barium or calcium. The resulting mixture is fed to a thickener 45, from which precipitates and clarified raw brine 43 are separately withdrawn. The clarified brine 43 is then filtered by brine filter 46. Solid precipitates are sent to a landfill, or disposed of by any suitable method. The filtered brine 43 is then pumped to a filtered brine tank 47. Next, secondary brine purification is performed on brine 43 via an ion exchange unit 48. Secondary brine purification ensures high efficiency and long lasting membrane electrolyzer operation. Deionized brine 43 is stored in tank 49 before being sent to electrolyzer 50.

Electrolyzer 50 is preferably a single or multiple membrane electrolyzer cell, as it is known to be safe, asbestos and mercury free and effective. However, in alternative embodiments, other electrolyzers may be used. Such commonly known electrolyzers are mercury and asbestos diaphragm electrolyzers, and membrane electrolyzers—monopolar and bipolar.

In electrolyzer 50, electric power is provided via an AC-DC rectifier 51. Deionized brine 53 and purified water 52 are pumped into electrolyzer 50. Application of electricity causes anions, i.e. chloride ions, to collect at the anode side of the electrolyzer 50 and cations, i.e. potassium and hydrogen ions, to collect at the cathode side of the electrolyzer 50. The chemical equations below describe the reactions that take places upon electrolysis of the brine.

$$2Cl^- \rightarrow Cl_2 + 2e^- \text{ (Anode)}$$

$$2H_2O + 2e^- \rightarrow H_2 + 2OH^- \text{ (Cathode)}$$

The chlorine gas will form at the anode while the water will be electrolyzed to form hydrogen gas. The remaining ions, K+ and OH− will combine to form an aqueous solution of the desired caustic potash product.

The chlorine produced from the weak solution of brine 43, is either drawn from the anode side of the cell in a vacuum or the solution is pumped to a dechlorination process. To process the wet chlorine, the gas is cooled and the brine 43 condensate is removed in a dechlorinator 54. The weak solution of brine 43 is then returned to the brine treatment area, specifically the salt dissolver 42. According to the present invention, the costly steps of drying and liquefying chlorine gas are eliminated. Instead, the chlorine is pumped to the hypo tower 64.

The sodium hypochlorite, or hypo, system consists of two plate exchange scrubbing towers 64 and 66, with associated pumps, tanks, coolers and fans. Operation of the hypo system is continuous. For safety reasons, the critical equipment is provided with a secure electric power supply to ensure continued operation during power failures and to avoid catastrophic consequences.

In order to manufacture sodium hypochlorite, chlorine gas from the dechlorinator 54, as well as vent gases from miscellaneous sources in the plant, are drawn by a vacuum or pumped through the primary hypo tower 64. Sodium hydroxide 65 from the secondary hypo tower 66, as well as recirculated sodium hydroxide and sodium hypochlorite from the primary hypo tower pump, are fed to the top of the primary hypo tower 64. The sodium hydroxide and chlorine react to form bleach according to the following equation:

$$2NaOH + Cl_2 \rightarrow NaOCl + NaCl + H_2O + \text{heat}$$

The exothermic nature of the above reaction causes the temperature to rise in the primary hypo tower 64, and therefore to maintain product stability the hypo is cooled before storage in storage tank 68. The primary hypo tower 64 is a plate exchanger with cooling water used to cool the liquor. The primary hypo chiller further reduces the hypo solution temperature to 60° F. using chilled water to slow down the chemical disintegration of the hypo product.

A portion of the cooled hypo product is transferred to storage tank 68 by primary hypo pump through the hypo filter. The filter ensures a clear product solution for storage. Product in various strengths, up to 20% by weight, can be produced by controlling the balance between chlorine, sodium hydroxide and water.

Vent gases leaving primary hypo tower 64 are piped to the secondary hypo tower 66. The gas flows upward through tower 66 under suction from hypo fan 67. Sodium hydroxide solution is circulated around tower 66 by the secondary hypo tower pump and absorbs any residual chlorine from primary hypo tower 64. Any unexpected large chlorine vents from primary hypo tower 64 will be absorbed and the chlorine emissions kept to a minimum with a two-tower scrubbing system.

The secondary hypo cooler 69 is used to remove the heat resulting from the reaction of chlorine in the secondary hypo tower 66, and the dilution of sodium hydroxide.

In the process that uses hypo fan 67, suction throughout the hypo system is provided by a centrifugal fan connected to the outlet of the secondary hypo tower 66. Effluent is scrubbed with caustic soda and discharged to the atmosphere. The suction provided by hypo fan 67 introduces an additional safety feature. In the case of a leak in the chlorine line in the hypo system, the pressure differential created by hypo fan 67 will cause air to be sucked into the line and not permit chlorine gas to escape. An installed spare fan is also provided. Both fans are connected to the standby power supply.

Figure 4:
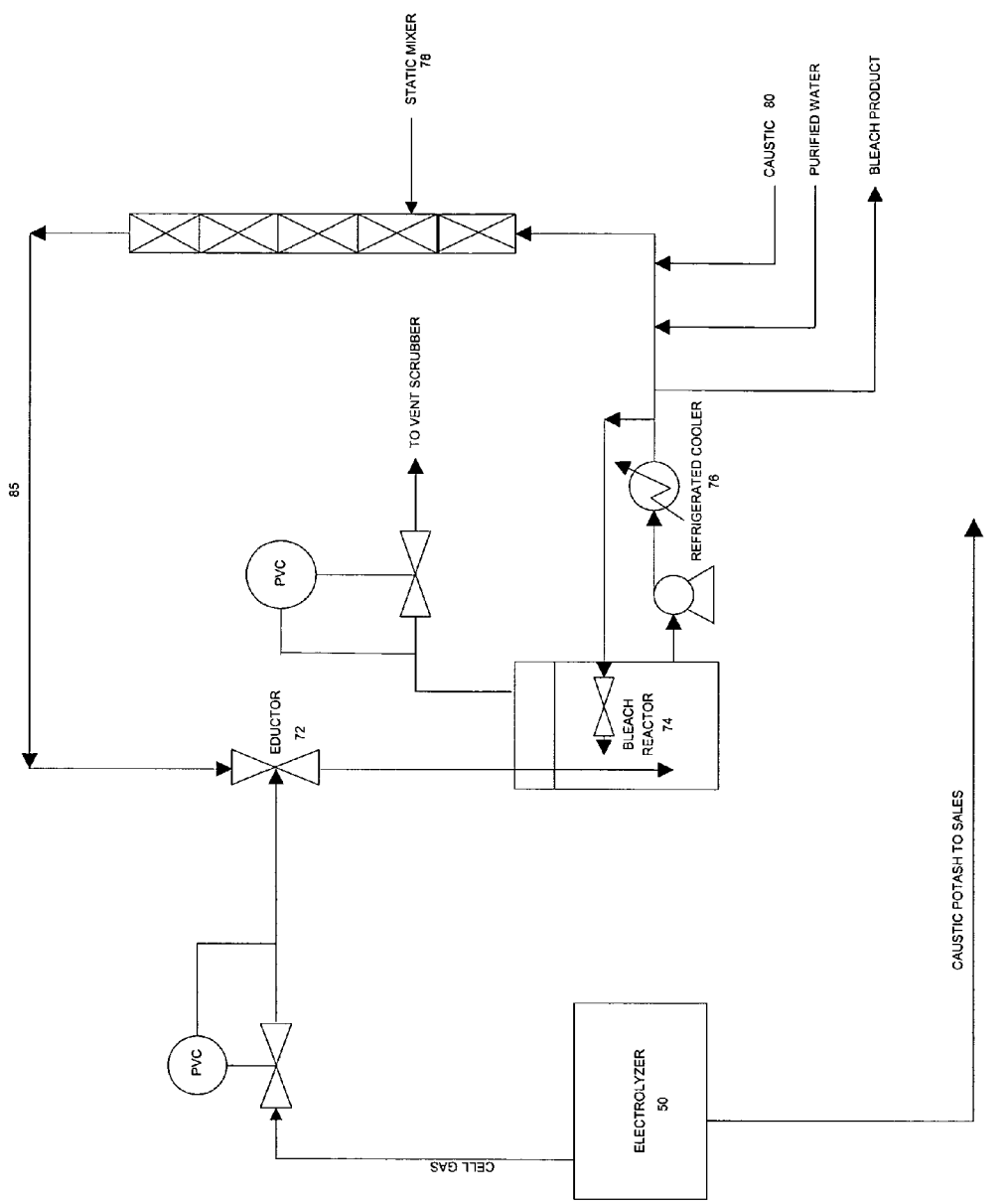
FIG. 4 is a schematic representation of a cell gas bleach reactor according to the preferred embodiment of the present invention.

An alternative embodiment for the manufacture of sodium hypochlorite is shown in FIG. 4. As discussed with respect to the preferred embodiment, the costly steps of drying and liquefying chlorine are also eliminated in this alternative embodiment. Chlorine from electrolyzer 50, vent gases and "off spec" product are mixed with purchased sodium hydroxide 80 solution to form sodium hypochlorite, i.e. hypo, solution. The system 85 consists of an eductor 72, bleach reactor 74, refrigerated cooler 76, static mixer 78 and various pumps and control valves. Purchased sodium hydroxide 80 from storage is pumped into the system.

Chlorine, saturated with water, leaves the electrolyzer 50 at a temperature of approximately 190-200° F. and is pumped through an eductor 72. Eductor 72 mixes the chlorine in solution with recycled hypo. The hypo solution enters the bleach reactor 74 where recycled, chilled hypo is pumped into reactor 74 for mixing. Then, bleach from reactor 74 is pumped through a refrigerated cooler 76 where specification product is drawn off and sent to storage. Other bleach is recycled onto the static mixer after controlled quantities of water and sodium hydroxide are added to the bleach. Through controls and analyzers for the amount of chlorine, water, sodium hydroxide and temperature in the system permit the production of bleach up to 20% by weight.

Figure 3:
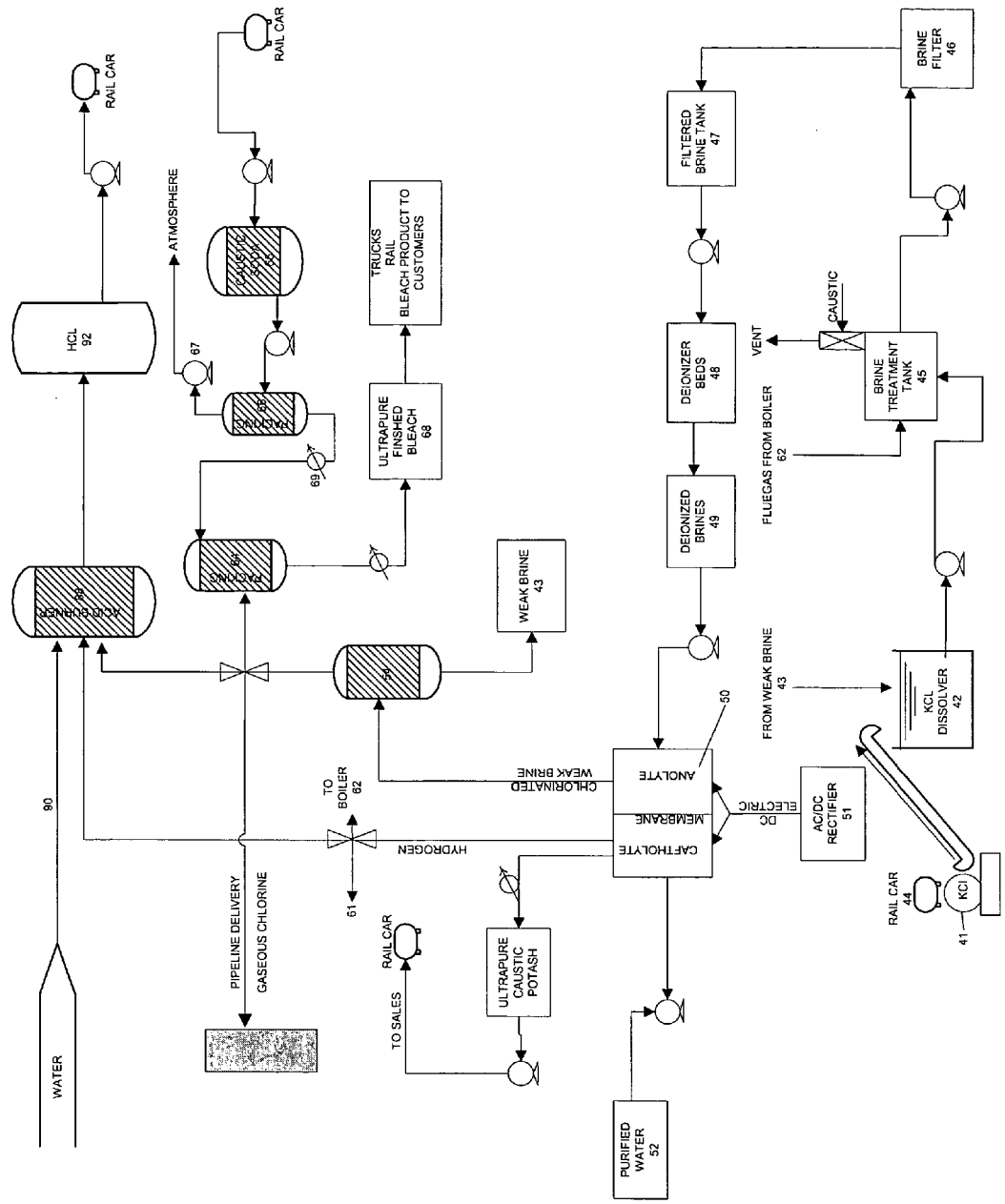
FIG. 3 shows an expanded view of the manufacturing process in accordance with the preferred embodiment of the present invention.

Additionally, the process may be modified to manufacture hydrochloric acid, as shown in FIG. 3. The hydrogen gas generated at the cathode of electolyzer 50 is sent to acid burner 88. Chlorine gas that comes out of the dechlorinator 54 may also be sent to acid burner 88. The chlorine is then burned in the presence of hydrogen and demineralized water provided by stream 90 to form hydrochloric acid, which is then sent to tank 92. The concentration of the acid may be controlled by the amount of water used in the process.

Potassium hydroxide and hydrogen, collected at the cathode side of electrolyzer 50, are drawn from the membrane cell electrolyzer 50. Potassium hydroxides leave the electrolyzer 50 at approximately 30-35% by weight in an aqueous solution at a temperature between approximately 190 and 200° F. This low strength potassium hydroxide solution is split. One stream is cooled and stored for use in the brine treatment tank 45. The other, major, stream is sent to evaporator 58 for removing the water. In evaporator 58, the hot potassium hydroxide solution is concentrated to the commercial grade specification, i.e., approximately 45%. Next, the product is cooled to about 170° F. and sent to product storage 60.

Hydrogen gas, also produced on the cathode side of the electrolyzer 50, may be sent to vent 61 (FIG. 3) for pressure control. The majority of the produced hydrogen, however, is cooled to remove water vapor before it is pumped to hydrogen compressor. After the hydrogen is compressed, it is sent to the boiler 62 for use as fuel. Alternatively, as discussed before, the collected hydrogen gas may be collected, stored and sold to customers, or send to acid burner 88 for use in hydrochloric acid production.

At a standalone plant, the present invention offers greater operating flexibility, profitability and safety than existing plants. A standalone plant would produce KOH and bleach and/or HCl since the transportation of gaseous chlorine is difficult and dangerous. Currently, there are no known plants with this processing option.

At a dedicated plant, for the situation where a customer wants to buy gaseous chlorine, this combination of processes enables the economic balancing of product production with chlorine demand. When gaseous chlorine demand is lowered, the plant operator can divert the chlorine production from chlorine pipeline deliveries to either bleach or HCl production. This permits the plant to continue to operate at full capacity. The liquid products, KOH, bleach, and HCl are all readily stored in rail cars or storage tanks and provide the capability of balancing supply and demand with alternate product sales or storage.

According to the process of the present invention, bulk chlorine is never stored under pressure in storage drums or rail cars. This eliminates the hazard of a chlorine cloud being released unintentionally. Small quantities of elemental chlorine exist only in the process just prior to being combined with sodium hydroxide, hydrogen or in the customer pipeline. In the case of a dedicated plant, chlorine is delivered to nearby customers and eliminates the use of rail cars and onsite chlorine storage.

Further, the invention is the combination of known processes that provide for greater revenue and profit than existing processes. There is no existing plant that combines the electrolysis of KCl with bleach and hydrochloric acid manufacture and has pipeline delivery of chlorine.

In addition, the hydrochloric acid and bleach manufacture of the present invention adds flexibility to consume the chlorine production when other chlorine derivative requirements are low.

According to another aspect of the present invention, the process, compared to existing potassium hydroxide-chlorine plants, eliminates the need for expensive chlorine drying and liquefaction. Two hypo towers, bulk sodium hydroxide storage, pumps and lines are added to the process. It is estimated that the net capital cost is reduced significantly with the invented process.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and principles of the invention. It should be appreciated that the present invention is capable of being embodied in other forms without departing from its essential characteristics.

What is claimed is:

1. A method of manufacturing a sodium bleach and an alkali metal hydroxide solution comprising potassium hydroxide, said method comprising the steps of:
    providing an aqueous solution of a chloride salt comprising potassium chloride;
    precipitating out impurities from said aqueous solution of said chloride salt by adding at least one of a barium or calcium chemical to form a precipitated aqueous solution;
    secondary purification of said precipitated aqueous solution by purifying said precipitated aqueous solution through an ion exchange unit to form a secondary precipitated aqueous solution;
    electrolyzing said secondary precipitated aqueous solution to collect chlorine gas at an anode and to collect hydrogen gas at a cathode, and to form an aqueous alkali metal hydroxide solution;
    pumping the chlorine gas to a dechlorinator and cooling said chlorine gas to form cooled chlorine gas;
    removing brine condensate from said cooled chlorine gas to form dried chlorine gas;
    pumping said dried chlorine gas to a hypo system to be mixed with stored sodium hydroxide, wherein said hypo system comprises a plate exchanger with cooling water; and
    combining said dried chlorine gas with said stored sodium hydroxide to form a sodium bleach.

2. A method according to claim 1, wherein said alkali metal is selected from the group consisting of sodium, potassium, and lithium.

3. A method according to claim 1, wherein said aqueous alkali metal hydroxide is sent to a concentrator for removal of water.

4. A method according to claim 3, wherein said concentrator operates in the temperature range of 170 degrees Fahrenheit (° F.) to 190 degrees ° F.

5. A method according to claim 1, wherein said electrolyzer is selected from the group consisting of a mercury and asbestos diaphragm electrolyzer cell, a membrane electrolyzer cell, and a multiple membrane electrolyzer cell.

6. A method according to claim 1, wherein said dried chlorine gas is sent to a bleach reactor to combine with sodium hydroxide.

7. A method according to claim 1, wherein said dried chlorine gas is said hypo system for reaction with sodium hydroxide to form bleach.

8. A method of manufacturing hydrochloric acid and an alkali metal hydroxide solution comprising potassium hydroxide, said method comprising the steps of:
    providing an aqueous solution of the chloride salt comprising potassium chloride;
    precipitating out impurities from said aqueous solution of said chloride salt by adding barium or calcium chemicals to form a precipitated aqueous solution;
    secondary purification of said precipitated aqueous solution by purifying said precipitated aqueous solution through an ion exchange unit to form a secondary precipitated aqueous solution;
    electrolyzing said secondary precipitated aqueous solution to collect chlorine at an anode and to collect hydrogen gas at a cathode, and to form an aqueous alkali metal hydroxide solution;
    cooling said hydrogen gas to remove water vapor from said hydrogen gas;
    cooling said chlorine gas and removing brine condensate from said chlorine gas to form a dried chlorine gas;
    burning said dried chlorine gas in a hydrochloric reactor containing said hydrogen and demineralized water to form hydrochloric acid;
    wherein the concentration of said hydrochloric acid can be adjusted by varying amount of said demineralized water added to said hydrochloric reactor.

9. A method according to claim 8, wherein said alkali metal is selected from the group consisting of sodium, potassium and lithium.

10. A method according to claim 8, wherein said aqueous alkali metal hydroxide is sent to a concentrator for removal of water.

11. A method according to claim 8, wherein said concentrator operates in the temperature range of 170 degrees ° F. to 190 degrees ° F.

* * * * *